(12) United States Patent
Ackermann et al.

(10) Patent No.: US 12,365,565 B2
(45) Date of Patent: Jul. 22, 2025

(54) ELEVATOR INSTALLATION COMPRISING ELEVATOR OPERATING DEVICES FOR PASSENGERS WITH PHYSICAL DISABILITIES

(71) Applicant: Inventio AG, Hergiswil (CH)

(72) Inventors: Marcel Ackermann, Kirchberg SG (CH); Nicolas Häfliger, Oberägeri (CH)

( * ) Notice: Subject to any disclaimer, the term of this patent is extended or adjusted under 35 U.S.C. 154(b) by 1018 days.

(21) Appl. No.: 17/310,438

(22) PCT Filed: Feb. 3, 2020

(86) PCT No.: PCT/EP2020/052605
§ 371 (c)(1),
(2) Date: Aug. 3, 2021

(87) PCT Pub. No.: WO2020/161069
PCT Pub. Date: Aug. 13, 2020

(65) Prior Publication Data
US 2022/0127111 A1   Apr. 28, 2022

(30) Foreign Application Priority Data
Feb. 8, 2019   (EP) .................................... 19156119

(51) Int. Cl.
*B66B 1/46*     (2006.01)
*B66B 1/14*     (2006.01)
(Continued)

(52) U.S. Cl.
CPC ................ *B66B 1/463* (2013.01); *B66B 1/14* (2013.01); *B66B 1/468* (2013.01); *B66B 3/002* (2013.01);
(Continued)

(58) Field of Classification Search
CPC ........... B66B 1/463; B66B 1/14; B66B 1/468; B66B 3/002; B66B 2201/103;
(Continued)

(56) References Cited

U.S. PATENT DOCUMENTS

| | | | |
|---|---|---|---|
| 4,678,062 A | 7/1987 | Sumka | |
| 2002/0036122 A1* | 3/2002 | Fayette | .................. B66B 3/008 187/247 |

(Continued)

FOREIGN PATENT DOCUMENTS

| | | |
|---|---|---|
| CN | 102164838 A | 8/2011 |
| CN | 204324622 U | 5/2015 |

(Continued)

*Primary Examiner* — Hoang M Nguyen
(74) *Attorney, Agent, or Firm* — Schlee IP International, PC; Alexander R. Schlee; Pascal A. Schlee (57) ABSTRACT

An elevator installation has elevator operating devices arranged on floors of a building and communicatively connected to an elevator controller. The elevator operating devices include main operating devices configured for inputting a destination floor desired by a passenger and for outputting travel information, and at least one secondary operating device arranged on one of the floors. The secondary operating device is next to the main operating device on the one floor and is communicatively connected to the elevator controller. The secondary operating device has a touch-sensitive screen system that confirms a destination floor, input by touch, by a tactilely perceptible feedback in order to support a passenger with a physical limitation when inputting a call. The elevator controller determines travel information for the destination floor input on the secondary operating device and communicates this information to the passenger by the main operating device arranged next to the secondary operating device.

13 Claims, 3 Drawing Sheets

(51) Int. Cl.
*B66B 3/00* (2006.01)
*G06F 3/01* (2006.01)
*G06F 3/041* (2006.01)

(52) U.S. Cl.
CPC . *B66B 2201/103* (2013.01); *B66B 2201/4615* (2013.01); *B66B 2201/463* (2013.01); *G06F 3/016* (2013.01); *G06F 3/041* (2013.01); *G06F 2203/04105* (2013.01)

(58) Field of Classification Search
CPC ...... B66B 2201/4615; B66B 2201/463; B66B 3/006; G06F 3/016; G06F 3/041; G06F 2203/04105
See application file for complete search history.

(56) References Cited

U.S. PATENT DOCUMENTS

| | | | |
|---|---|---|---|
| 2004/0000453 A1 | 1/2004 | Eccleston | |
| 2011/0259674 A1* | 10/2011 | Silberhorn | B66B 5/0031 187/249 |
| 2012/0168262 A1* | 7/2012 | Finschi | B66B 1/467 187/392 |
| 2014/0041968 A1* | 2/2014 | Tokura | B66B 1/2408 187/389 |
| 2016/0272461 A1* | 9/2016 | Wienholz-Buß | B66B 1/468 |
| 2018/0162688 A1* | 6/2018 | Troesch | G05B 15/02 |

FOREIGN PATENT DOCUMENTS

| | | |
|---|---|---|
| CN | 107635901 A | 1/2018 |
| CN | 109002819 A | 12/2018 |
| EP | 0445419 A1 | 9/1991 |
| EP | 0699617 B1 | 5/2000 |
| EP | 1276691 B1 | 8/2005 |
| EP | 2331443 B1 | 5/2013 |
| EP | 3401258 A1 | 11/2018 |
| JP | 2004203616 A | 7/2004 |
| JP | 2011037570 A | 2/2011 |
| JP | 2013056732 A | 3/2013 |
| JP | 2016216166 A | 12/2016 |
| KR | 20180077543 A | 7/2018 |
| TW | M502678 U | 6/2015 |
| WO | 2009144259 A1 | 12/2009 |
| WO | 2015081356 A1 | 6/2015 |
| WO | 2015169351 A1 | 11/2015 |
| WO | 2016090392 A1 | 6/2016 |
| WO | 2016184519 A1 | 11/2016 |

* cited by examiner

ELEVATOR INSTALLATION COMPRISING ELEVATOR OPERATING DEVICES FOR PASSENGERS WITH PHYSICAL DISABILITIES

FIELD

The technology described here relates in general to an elevator installation in a building. Embodiments of the technology relate in particular to an elevator installation comprising elevator operating devices for passengers with physical disabilities and a method for operating such an elevator installation.

BACKGROUND

In buildings having elevator installations, elevator operating devices, by means of which a passenger can call an elevator, are arranged on the individual floors. In known elevator installations, an elevator operating device arranged on one floor has up/down buttons, such that the passenger can input the desired direction of travel. In this elevator installation, there is a car operating device in the elevator car, by means of which the passenger in the elevator car can input the desired destination floor. In other known elevator installations, the passenger can already input the destination floor on an elevator operating device on the floor. For this purpose, the elevator installation is equipped with destination call control technology, and the elevator operating devices arranged on the floors each have either a keyboard, a touch-sensitive screen, and/or a data acquisition device (e.g. in the form of an RFID card reader known from EP 0699617 B1) for input of the destination floor.

Elevator operating devices should also be conveniently and reliably operable for passengers with physical disabilities. The physical disabilities can affect vision, hearing or physical mobility, for example. Different approaches are known for meeting these requirements. Elevator operating devices, for example, which each have or display a special button (for example having a symbol for a wheelchair) are generally known. If this button is actuated, the elevator installation switches to a disability-friendly operating mode. In addition, it is known from EP 2 331 443 B1, for example, that an elevator operating device having a touch-sensitive screen changes to a special input mode when a type of wandering movement is detected on the touch screen.

Although the approaches mentioned facilitate the operation of an elevator installation by a passenger with a physical disability, touch-sensitive screens having a smooth surface can nevertheless represent a difficulty in operation, in particular for passengers with limited vision. There is therefore a need for a technology which facilitates operation.

SUMMARY

One aspect of the technology described here relates to an elevator installation in which a number of elevator cars, controlled by an elevator controller, can be moved between floors. Main operating devices are communicatively connected to the elevator controller and are arranged on the floors, a main operating device being configured in each case for inputting a destination floor desired by a passenger and for outputting travel information. At least one secondary operating device is arranged on one of the floors, next to the main operating device arranged there, and is communicatively connected to the elevator controller. The at least one secondary operating device has a touch-sensitive screen system which is configured to confirm a destination floor input by touch by means of tactilely perceptible feedback, in order to support a passenger with a physical disability when inputting a call. The elevator controller is configured to determine travel information for the destination floor input on the at least one secondary operating device and to communicate this determined travel information to the passenger by means of the main operating device arranged next to the at least one secondary operating device.

Another aspect of the technology relates to a method for operating an elevator installation, in which main operating devices which are communicatively connected to an elevator controller are arranged on floors and at least one secondary operating device is arranged on one of the floors, next to the main operating device arranged there, and is communicatively connected to the elevator controller. The at least one secondary operating device has a touch-sensitive screen system which is configured to confirm a destination floor input by touch by means of tactilely perceptible feedback, in order to support a passenger with a physical disability when inputting a call. According to the method, a destination call input by a passenger is received by the elevator controller and a first identifier is determined by the elevator controller by means of the destination call. The first identifier identifies the main operating device or the at least one secondary operating device from which the received destination call originates. The elevator controller determines travel information for the received destination call. If the destination call originates from the at least one secondary operating device, a second identifier is determined by the elevator controller, which second identifier identifies a main operating device which is arranged next to the at least one secondary operating device on the floor. The travel information determined for the destination call input on the at least one secondary operating device is communicated to the passenger by the main operating device, the main operating device being identified by the second identifier.

The technology described here provides an elevator installation in which passengers with a physical disability can input a desired destination floor on a secondary operating device. On at least one floor, a secondary operating device is arranged in addition to a main operating device, such as is used, for example, in elevator installations having destination call control technology. The secondary operating device is specifically configured for this purpose; it in particular supports a passenger with a physical handicap when inputting a call and confirms the input destination floor by means of tactilely perceptible feedback. However, the determined travel information is not communicated to the passenger by means of the secondary operating device, but instead by means of the adjacently arranged main operating device.

The secondary operating device according to the technology described here can advantageously be used in combination with known elevator operating devices in which destination floors are to be input on touch-sensitive screens. The use of said touch-sensitive screens can be associated with difficulties, in particular for passengers with limited vision. In relation to the main operating device, the secondary operating device can be regarded as an auxiliary component or expansion component.

Passengers with a physical disability can use the secondary operating device; they can, for example, get to the location of the secondary operating device by means of signage (e.g. with the help of a cane or guide dog) in order to then be supported by the secondary operating device when inputting the call, for example by means of voice guidance and the tactilely perceptible feedback.

Passengers without a physical disability, however, can still use the main operating devices with which they are already familiar. In one embodiment, these each have a touch-sensitive screen and an audio device. The touch-sensitive screen is configured to display input fields (buttons) assigned to destination floors, to detect a touch of one of the input fields, and to display travel information determined for a destination call. The audio device is configured to announce the determined travel information. The travel information can indicate the elevator car responding to the destination call and possibly include route or direction information (e.g. left, right).

In comparison with the main operating device, the secondary operating device has a reduced functionality. A device for communicating travel information is not required in the secondary operating device, for example, because this communication takes place by means of the adjacent main operating device. For this reason, no return channel from the control device to the secondary operating device is required, for example. A secondary operating device according to the technology described here therefore has a low technical complexity and is therefore also cost-effective.

In one embodiment, the secondary operating device, like the main operating devices, has a touch-sensitive screen system. Similar input and output technologies are therefore used in the secondary operating device and the main operating devices, such that their external appearance and/or shape can be designed accordingly as required. A more uniform appearance can thus be created with regard to the elevator operating devices on a floor.

In one embodiment, the main operating devices and the at least one secondary operating device each have a housing, the housing of the at least one secondary operating device being arranged adjacent to the housing of the main operating device present next to said secondary operating device. The at least one secondary operating device can thereby be arranged flexibly and independently of the main operating device; the housings can touch one another or be arranged at a greater or lesser distance from one another.

Flexibility is also provided by the fact that, in one embodiment, the main operating devices and the at least one secondary operating device are communicatively connected to the elevator controller by a communication network. For example, the elevator operating devices can be communicatively connected to the communication network independently of one another. In one embodiment, the communication network also allows the supply of electrical energy (Power over Ethernet), such that no separate lines have to be provided for the energy supply.

In one embodiment, the touch-sensitive screen system comprises an actuator which, when actuated by a control voltage, causes a surface of the screen system to vibrate, the vibration being the tactilely perceptible feedback. The type and strength of the vibration can in this case be set in a flexible manner.

In one embodiment, the touch-sensitive screen system comprises a force measuring device and a control device. The force measuring device is configured to measure a force with which a passenger presses on the user interface of the touch-sensitive screen system, the control device being configured to only register the measured force as a triggering force if the measured force reaches a specified threshold value. In this way, incorrect entries caused by unintentional touching can be reduced, because the passenger has to express their request by pressing harder.

Various aspects of the improved technology are described in greater detail below with reference to embodiments in conjunction with the drawings. In the drawings, identical elements have identical reference signs.

DETAILED DESCRIPTION

Figure 1:
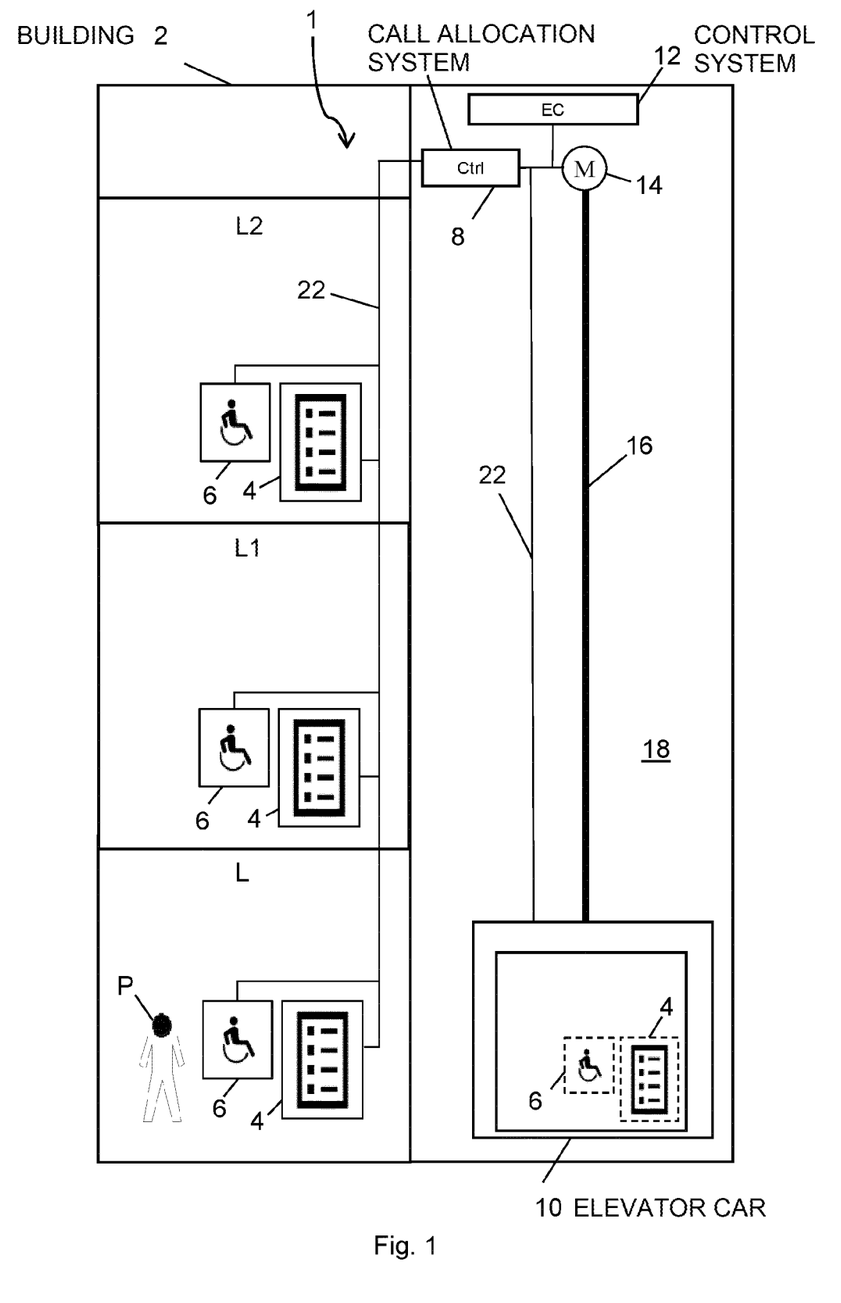
FIG. 1 is a schematic view of an exemplary situation in a building having a plurality of floors and having an exemplary elevator installation.

FIG. 1 is a schematic view of an exemplary situation in a building 2 which has a plurality of floors L, L1, L2 which are served by an elevator installation 1. The floor L can be an entrance hall of the building 2, into which the passengers P enter when entering the building 2 and from which the passengers leave the building 2 again. If a passenger enters the floor L, each floor L1, L2 of the building 2 can be reached from there, with appropriate access authorization, by means of the elevator installation 1. For the purpose of illustration, of the elevator installation 1, only one elevator controller 8, 12, a drive machine 14, a suspension means 16 (e.g. steel cables or flat belts), and an elevator car 10 (hereinafter also referred to as car 10), which is suspended on the suspension means 16 and movable in a shaft 18, and a number of elevator operating devices 4, 6 are shown in FIG. 1. A person skilled in the art would recognize that the elevator installation 1 can also comprise a plurality of cars 10 in one or more shafts 18 that are controlled by a group control unit. Instead of a traction elevator shown in FIG. 1, the elevator installation 1 can also have one or more hydraulic elevators.

In one embodiment, the elevator installation 1 is equipped with destination call control technology. Accordingly, for example, an elevator operating device 4, 6 is arranged on each floor L, L1, L2, on which a passenger P can already input a desired destination floor on the floor L, L1, L2; after the input of the destination floor by the passenger P (i.e. the input of a destination call), information about the boarding floor and the destination floor is available. Further details regarding the destination call control technology are provided elsewhere in this description.

According to an embodiment of the elevator installation 1, elevator operating devices 4, 6 are used which are provided for different passenger groups. Passengers P who have a physical disability, for example limited vision, blindness or limited mobility, can use the elevator operating device 6 which is specifically configured for their needs. In both FIG. 1 and in a specific embodiment, the elevator operating device 6 can be visibly marked; for example, a symbol for a wheelchair or another marking is shown on a user interface in order to indicate the intended use of said elevator operating device for passengers P with a physical disability. The elevator operating device 4 is provided for all other passengers P. Such an elevator operating device 4 is known, for example, from known elevator installations having destination call control technology; it can, for example, indicate destination floors (e.g. in the form of individual buttons) and any associated floor-specific information (e.g. restaurant, garage, entrance hall) on a user interface. If it seems to be helpful for the present description of the technology, the elevator operating devices 4 are also referred to as main operating devices 4 and the elevator operating device 6 is also referred to as the secondary operating device 6 for better differentiation.

In the situation shown in FIG. 1, the technology described here can be used in an advantageous manner. Briefly and by way of example, the technology described here allows passengers P with physical disabilities, e.g. with limited vision, blindness or limited mobility, to be able to input elevator calls conveniently and reliably in elevator installations 1 in which touch-sensitive screens (hereinafter referred to as touchscreen(s)) are provided for call inputs. Passengers P without physical disabilities, however, can continue to use the main operating devices 4 as they know from known elevator installations 1 having destination call control technology. Passengers P who are blind, for example, can be guided to one of the secondary operating devices 6 (e.g. using a cane or a guide dog) in order to input the desired destination floor L, L1, L2 on said secondary operating device by touching the touchscreen. As is described below, the secondary operating device 6 supports the input of the destination floor by means of tactilely (i.e. via the sense of touch) perceptible feedback and one or more voice messages. Regardless of whether the passenger P carries out the call input on the main operating device 4 or on the secondary operating device 6, the main operating device 4 informs the passenger P about the car 10 allocated to the elevator call (destination call), in the case of a blind passenger, for example, by means of a voice message.

According to the embodiment shown in FIG. 1, the elevator controller 8, 12 consists of two subsystems, a control system 12, and a call allocation system 8. The control system 12 controls the movement of the elevator car 10, while the call allocation system 8 determines the "best" elevator car 10. For this purpose, the call allocation system 8 executes an allocation algorithm in order to allocate a destination call input on a floor-side elevator operating device 4, 6 to an elevator car 10. Such allocation algorithms are known to a person skilled in the art, for example from EP 1 276 691 B1. A person skilled in the art would recognize that, depending on the design of the elevator installation 1, the allocation algorithm can also be executed with the involvement of the floor-side elevator operating devices 4, 6, as described, for example, in EP 1 276 691 B1. The control system 12 controls the drive machine 14, inter alia, such that the allocated car 10, together with the passenger P, is moved from the boarding floor to the destination floor.

According to the embodiment shown in FIG. 1, a main operating device 4 and a secondary operating device 6 are arranged on each floor L, L1, L2, each of said operating devices being coupled to the elevator controller 8, 12 via a communication network 22. As indicated in FIG. 1, each elevator operating device 4, 6 has a housing (see FIG. 2), the housings or the elevator operating devices 4, 6 being arranged relatively close to one another. A person skilled in the art would recognize that the arrangement thereof can be adapted to the situation in building 2. The housings of the elevator operating devices 4, 6 can, for example, touch or be at a relatively small distance from one another; however, the housing spacing can also be selected such that, for example, a passenger P in a wheelchair or with a guide dog can input a destination call on the secondary operating device 6 while another passenger P is at the main operating device 4.

Depending on the type and use of the building 2, only one type of these elevator operating devices 4, 6 may be present on one or more floors L, L1, L2. In one embodiment, a secondary operating device 6 can, for example, be arranged only in an entrance hall of the building 2 next to the main operating device 4. The secondary operating device 6 is communicatively connected to the communication network 22. The secondary operating device 6 can be connected directly to the communication network 22, as shown in FIG. 1, or indirectly via the primary operating device 4; in the latter case, the secondary operating device 6 is connected to the main operating device 4, which in turn is connected to the communication network 22. In one embodiment, the elevator operating devices 4, 6 are supplied with electrical energy via the communication network 22, for example by means of a technology known as Power over Ethernet (PoE).

Figure 2:
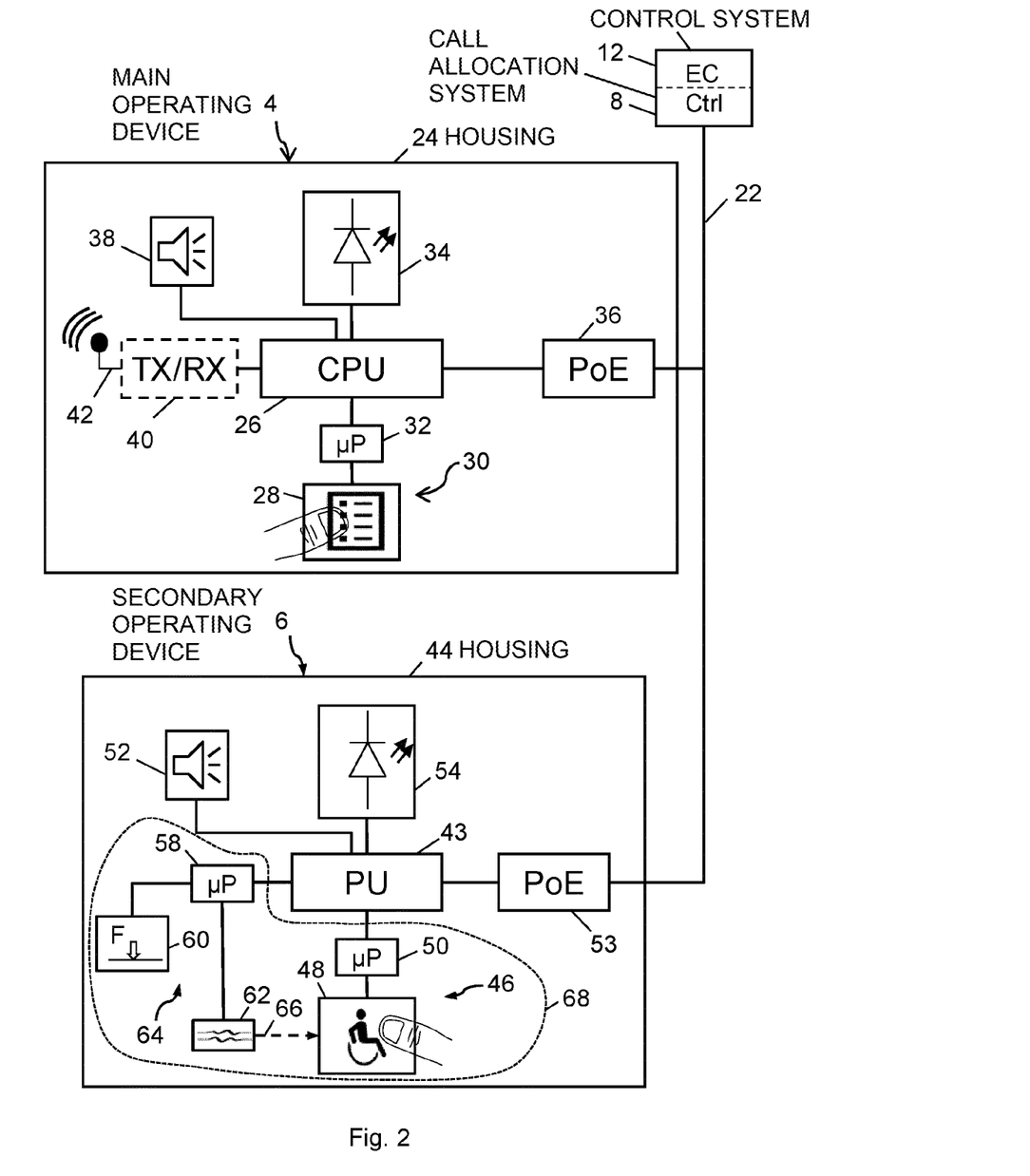
FIG. 2 is a schematic view of exemplary elevator operating devices which are arranged on a floor in the elevator installation according to FIG. 1.

FIG. 2 is a schematic view of embodiments of the main operating device 4 and the secondary operating device 6, as can be used in the elevator installation 1 according to FIG. 1 on a floor L, L1, L2. The elevator operating devices 4, 6 are communicatively connected to the elevator controller 8, 12 via the communication network 22. The main operating device 4 has a housing 24 and the secondary operating device 6 has a housing 44, as a result of which the elevator operating devices 4, 6 can be arranged on a building wall or standing on the floor. A person skilled in the art would recognize that the housings 24, 44 can possibly be omitted if the elevator operating devices 4, 6 are installed in a building wall or a door frame of a floor-side elevator door. A person skilled in the art would also recognize that the elevator operating devices 4, 6 are arranged at a height that is user-friendly or prescribed by a standard.

In the embodiment shown, a touch-sensitive screen 30 (touchscreen 30), a central control and processing device 26 (CPU), a lighting device 34, an electroacoustic transducer 38 (e.g. a speaker) and a communication device 36 (PoE, Power over Ethernet) are arranged in the housing 24 of the main operating device 4. Depending on the design of the elevator operating device 4, a transmitting and receiving device for radio signals 40 (TX/RX) having an antenna 42 (as an optional component, the transmitting and receiving device for radio signals 40 is shown by dashed lines) can be arranged in the housing 24. The central control and processing device 26 is communicatively connected to the components mentioned in order to ensure the operation and the tasks of the main operating device 4.

The touchscreen 30 comprises a processor 32 and a user interface 28, on which input buttons are illustrated in FIG. 2. Since a transparent glass plate (not shown) covers the touchscreen 30, the input buttons are visible to the passenger P. The processor 32 is connected to the central control and processing device 26 and generates a signal, for example, when a passenger P touches one of the shown input buttons with a finger. The input buttons are assigned to destination floors, it being possible for floor-specific information to also be displayed. The structure and function of a touch screen are known to a person skilled in the art, and further explanations therefore do not appear to be necessary.

The lighting device 34 is used to illuminate the user interface 28 of the elevator operating device 4, or just regions of the user interface 28. Controlled by the central control and processing device 26, the lighting device 34 can illuminate the user interface 28 such that the displayed input buttons can be perceived by a passenger P, in particular in poor lighting conditions. The lighting device 34 can also illuminate the user interface 28 or individual input buttons with colored light in order to confirm the input of the elevator call to the passenger P. In one embodiment, the lighting device 34 comprises one or more LED light sources.

On the main operating device 4, a passenger can select a destination floor by touching one of the displayed input buttons, and thus input an elevator call (destination call) to a desired destination floor. If a car 10 is allocated to this destination call, the central control and processing device 26 actuates the touchscreen 30 in order to display an identifier for the car 10 responding to the destination call (e.g. a letter or a number) and possibly directional information on the user interface 28 of the touch screen. In addition, the central control and processing device 26 can actuate the transducer 38 (speaker), in order to generate a corresponding voice message (e.g. car and directional information).

In one embodiment, the transmitting and receiving device for radio signals 40 (TX/RX) (if present) can offer an alternative or additional option for the call input. In order to make the call input possible, the transmitting and receiving device for radio signals 40 can comprise an RFID reader, a reader for an optical code (e.g. bar code, QR code, or color code) or a radio module which communicates with a portable communication device (e.g. mobile radio/mobile phone, smartphone, tablet PC) of a passenger P. A person skilled in the art would recognize that the passenger P is also informed of the car 10 responding to the elevator call in the case of these alternatives, for example by means of the touchscreen 30.

In the embodiment shown, a touchscreen 46 (arranged under a glass plate), a communication device 53 (PoE) and a lighting device 54 are arranged in the housing 44 of the secondary operating device 6. As in the main operating device 4, these components are used for displaying a user interface 48, communication (including energy supply) and lighting. An electroacoustic transducer 52 (e.g. a speaker or buzzer) can optionally be provided in order to generate acoustic feedback, e.g. when the touchscreen 46 is touched. The touchscreen 46 comprises a processor 50 and the user interface 48, on which a wheelchair symbol is illustrated in FIG. 2. The processor 50 is connected to a processing device 43 (PU) and detects a signal, for example, when a passenger P touches the user interface 48 with a finger.

In one embodiment of the secondary operating device 6, the touchscreen 46 is combined with a device 64, from which a touch-sensitive screen system 68 is formed. For the purpose of illustration, the screen system 68 is bordered by dashed lines in FIG. 2; a person skilled in the art would recognize that this border is exemplary. The mode of operation of the user interface 48 is modified by the device 64, as a result of which supported operation by means of tactilely perceptible feedback is made possible. If the user interface 48 is touched, tactilely perceptible feedback occurs in response to this touch. Depending on the design, the tactilely perceptible feedback can be accompanied by a vibration noise and/or a voice message, for which the electroacoustic transducer 52 is provided. A tactilely perceptible feedback module created from such a combination of a touch screen and a user interface guided by touch is available, for example, from the company next system Vertriebsges.m.b.H, Vienna, Austria. This feedback module is particularly suitable for blind and visually impaired people because it allows them to orientate themselves on a smooth surface.

The device 64 shown in FIG. 2 comprises a force measuring device 60 (e.g. in the form of a thin layer of capacitive pressure sensors), an actuator 62 and a control device 58 which is connected to the force measuring device 60 and the actuator 62. The force measuring device 60, in conjunction with the control device 58, measures the force with which the passenger P presses on the user interface 48 of the touchscreen 46. The force measuring device 60 detects the smallest changes in a distance between the (flexible) glass surface and the thin layer of capacitive pressure sensors or an underlying layer. In one embodiment, the control device 58 is configured such that it only registers the measured force as a triggering force if the measured force reaches a specified threshold value; only then is the touch considered to be a deliberate pressing or a deliberate input.

In one embodiment, the actuator 62 comprises two electrode plates, a first electrode plate being designed as a conductive grid and rigidly connected to the housing glass plate, and a second electrode plate being connected to the touchscreen 46 for joint movement. A restoring element holds the electrode plate at a desired distance. Such an arrangement can be referred to as an electrostatic parallel plate actuator. If the control device 58 controls the actuator 62 by applying a voltage, the parameters of which, such as voltage, frequency, rising and falling edges can be set (e.g. after exceeding the triggering force), the electrode plates move relative to one another counter to a force exerted by the restoring element; the glass plate moves accordingly, as a result of which the tactilely perceptible feedback is generated. The effect of the actuator 62 on the user interface 48 is indicated by an arrow 66 in FIG. 2.

The communication network 22 connects the elevator operating devices 4, 6 to the elevator controller 8, 12 and thus makes communication possible between the elevator controller 8, 12 and the elevator operating devices 4, 6. For this communication, the elevator operating devices 4, 6 and the elevator controller 8, 12 can be directly or indirectly connected to the communication network 22. The communication network 22 can comprise a communication bus system, individual data lines, or a combination thereof. Depending on the implementation of the communication network 22, individual addresses and/or identifiers can be allocated to the elevator controller 8, 12 and each elevator operating device 4, 6, such that, for example, the elevator controller 8, 12 can send a message to a desired elevator operating device 4, 6 in a targeted manner. Communication can take place in accordance with a protocol for wire-bound communication, for example the Ethernet protocol. As mentioned, in one embodiment the elevator operating devices 4, 6 are supplied with electrical energy via the communication network 22 (PoE).

Figure 3:
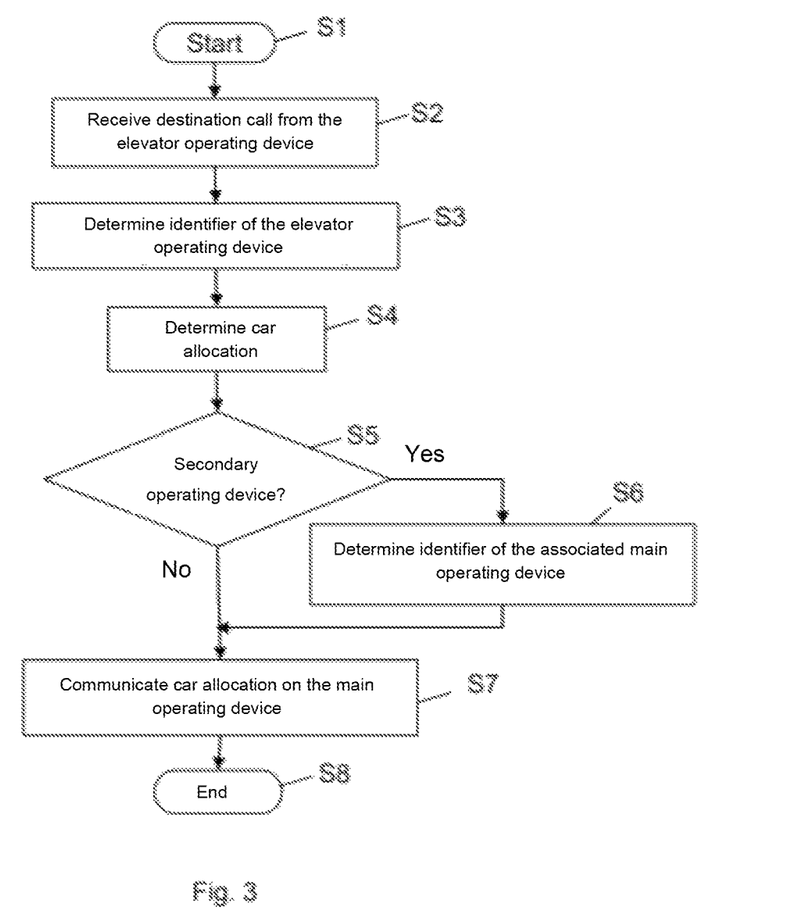
FIG. 3 is an exemplary view of an embodiment of a method for operating the elevator installation.

With the understanding of the above-described basic system components of the elevator installation 1 and their functionalities, a description of an exemplary method for operating the elevator installation 1 shown in FIG. 1 is given below with reference to FIG. 3. FIG. 3 shows an exemplary flow chart of the method; it begins in step S1 and ends in step S8. A person skilled in the art would recognize that the division into these steps is exemplary and that one or more of these steps may be divided into one or more sub-steps or that a plurality of the steps may be combined into one step.

The method is described with reference to a passenger P with one of the physical disabilities mentioned. In this case, it is assumed that the passenger P is on a floor L, L1, L2, within reach of a secondary operating device 6 arranged there, and would like to input a destination call on said secondary operating device in order be transported from this floor L, L1, L2 to a destination floor L, L1, L2 by the elevator. Each elevator operating device 4, 6 is activated. The symbol for a wheelchair, for example, is displayed on the user interface 48 of the secondary operating device 6, and buttons for the destination floor and any associated floor-specific information, for example, are displayed on the user interface 28 of the main operating device 4. As indicated in FIG. 1, the main operating device 4 is arranged close to the secondary operating device 6.

If the passenger P touches the user interface 48 of the secondary operating device 6, the control device 50 of the touchscreen 46 detects the point at which the touch takes place and, by means of the electroacoustic transducer 52, generates a voice message that indicates a floor L, L1, L2 assigned to this point (button). At the same time, tactilely perceptible feedback is generated by the actuator 62. If the passenger P moves a finger over the user interface 48, the assigned floor L, L1, L2 is announced for each location (button) assigned to a floor L, L1, L2 and fed back in a tactilely perceptible manner. If the finger is at the desired point (button), the passenger can increase the pressure force at this point, which the force measuring device 60 recognizes, in order to input the destination call.

The destination call input in this way is received in step S2. When the destination call is received, information about the boarding floor and the destination floor is available, such that an allocation algorithm can use this information to select and allocate a car 10 for this journey. In one embodiment, the call allocation system 8 receives the destination call.

In step S3, an identifier of the secondary operating device 6 is determined. Such an identifier is available when the destination call is received; it generally identifies the elevator operating device 4, 6 from which the destination call originated or on which the destination call was input. If the elevator operating device 4, 6 is identified, it is also known whether the destination call was input on a secondary operating device 6 or on a main operating device 4. The location of the elevator operating device 4, 6, and thus the boarding floor, for example, is also obtained from the identifier. A person skilled in the art would recognize that steps S2 and S3 can be combined into one step.

In step S4, a car allocation is determined for the destination call received in step S2. In one embodiment, the call allocation system 8 executes the allocation algorithm. A person skilled in the art would recognize that, in another embodiment, the allocation algorithm can be executed in a distributed manner on the call allocation system 8 and any further components of the elevator installation 1, for example with the involvement of the elevator operating devices 6. Allocation algorithms are known to the person skilled in the art; from a number of available cars 10, they determine the car 10 which can best respond to the destination call, taking "costs" into consideration.

In step S5, it is checked whether the destination call originates from a secondary operating device 6. In one embodiment, this check is carried out on the basis of the identifier determined in step S3. If the destination call originates from a secondary operating device 6, the method proceeds along the yes branch to step S6. If, however, the destination call originates from a main operating device 4, the method proceeds along the no branch to step S7.

In step S6, the identifier of the secondary operating device 6 determined in step S3 is used to determine the main operating device 4 arranged in its vicinity. Details regarding the arrangement of the elevator operating devices 4, 6 can be specified, for example, in an installation plan and/or building plan. When carrying out the method, the elevator controller 8, 12 or the call allocation system 8 can access electronically stored installation plan or building plan data.

In step S7, the car allocation determined in step S4 is communicated to the passenger P on a main operating device 4. In one embodiment, the call allocation system 8 sends the car allocation to the main operating device 4 identified by the identifier. Depending on the situation, it is the identifier determined in step S3 if the destination call was input on this main operating device 4, or the identifier determined in step S6 if the destination call was input on the (adjacent) secondary operating device 6. The passenger P can also be informed of the call allocation optically and/or acoustically, for example by means of a voice message.

In one embodiment, the call allocation is communicated exclusively on the main operating device 4. In another embodiment, the passenger P can also be informed of the call allocation on the secondary operating device 6.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator installation having at least one elevator car controlled by an elevator controller for movement between floors of a building, the elevator installation comprising:
   a plurality of main operating devices communicatively connected to the elevator controller and arranged on the floors, wherein each of the main operating devices is configured for inputting destination floors desired by passengers and for outputting travel information related to the destination floors;
   a secondary operating device arranged on one of the floors next to the main operating device arranged on the one floor and communicatively connected to the elevator controller;
   wherein the secondary operating device has a touch-sensitive screen system configured to confirm a destination floor input by touch by generating tactilely perceptible feedback to support a passenger having a physical limitation inputting the destination floor; and
   wherein the elevator controller is configured to determine travel information for the destination floor input on the secondary operating device and to communicate the determined travel information to the passenger by the main operating device arranged next to the secondary operating device.

2. The elevator installation according to claim 1 wherein each of the main operating devices and the secondary operating device has a housing, wherein the housing of the secondary operating device is arranged adjacent to the housing of the main operating device next to the secondary operating device.

3. The elevator installation according to claim 1 wherein the main operating device next to the secondary operating device includes: a touch-sensitive screen configured to display input fields assigned to the destination floors, to detect a touch of one of the input fields, and to display travel information determined for the destination floor to which the touched input field is assigned; and an audio device configured to announce the determined travel information.

4. The elevator installation according to claim 1 wherein each of the main operating devices includes: a touch-sensitive screen configured to display input fields assigned to the destination floors, to detect a touch of one of the input fields, and to display travel information determined for the destination floor to which the touched input field is assigned; and an audio device configured to announce the determined travel information.

5. The elevator installation according to claim 1 wherein the main operating devices and the secondary operating device are communicatively connected to the elevator controller by a communication network.

6. The elevator installation according to claim 5 wherein the communication network transmits electrical energy and the main operating devices and the secondary operating device are supplied with the electrical energy from the communication network.

7. The elevator installation according to claim 1 wherein the touch-sensitive screen system includes an actuator that, when actuated by a control voltage, causes a surface of the screen system to vibrate thereby generating the tactilely perceptible feedback.

8. The elevator installation according to claim 1 wherein the touch-sensitive screen system includes a force measuring device and a control device, wherein the force measuring device measures a force with which a passenger presses on a user interface of the touch-sensitive screen system, and wherein the control device only registers the measured force as a triggering force if the measured force reaches a specified threshold value.

9. The elevator installation according to claim 1 wherein each of the main operating devices participates in the determination of the travel information for the input destination floor.

10. A method for operating an elevator installation having a plurality of main operating devices communicatively connected to an elevator controller and arranged on floors of a building, a secondary operating device arranged on one of the floors separately from the main operating device arranged on the one floor, the secondary operating device being communicatively connected to the elevator controller, wherein the secondary operating device has a touch-sensitive screen system configured to confirm a destination floor input by touch by generating tactilely perceptible feedback to support a passenger with a physical limitation inputting the destination floor, the method comprising the steps of:

the elevator controller receiving a destination call input by a passenger;

the elevator controller determining a first identifier using the destination call, wherein the first identifier identifies the main operating device or the secondary operating device from which the received destination call originated;

the elevator controller determining travel information for the received destination call;

when the destination call originated from the secondary operating device, the elevator controller determines a second identifier that identifies the main operating device that is arranged next to the secondary operating device; and communicating from the elevator controller the travel information determined for the destination call input on the secondary operating device to the passenger by the main operating device identified by the second identifier.

11. The method according to claim 10 including displaying input fields assigned to the destination floors on a touch-sensitive screen of each of the main operating devices, detecting a touch of one of the input fields and displaying the determined travel information for the destination floor call to which the touched input field is assigned, and announcing the determined travel information by an audio device.

12. The method according to claim 10 wherein the touch-sensitive screen system of the secondary operating device includes an actuator, operating the actuator with a control voltage to generate a vibration of a surface of the touch-sensitive screen system, and wherein the vibration is the tactilely perceptible feedback.

13. The method according to claim 10 wherein the touch-sensitive screen system includes a force measuring device and a control device, measuring a force with which a passenger presses on a user interface of the touch-sensitive screen system with the force measuring device, and wherein the measured force is only registered as a triggering force by the control device if the measured force reaches a specified threshold value.

* * * * *